2 Sheets—Sheet 1.
S. GARDNER.
RATCHET DRILL.
No. 10,502. Reissued July 29, 1884.
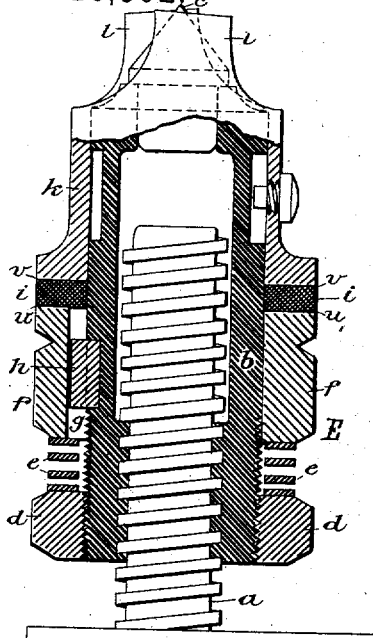
Fig. 1.
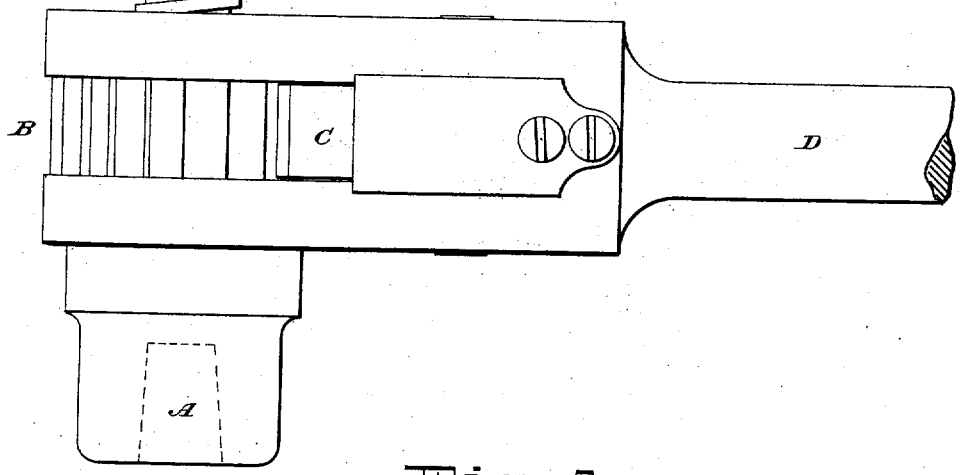
Fig. 2.
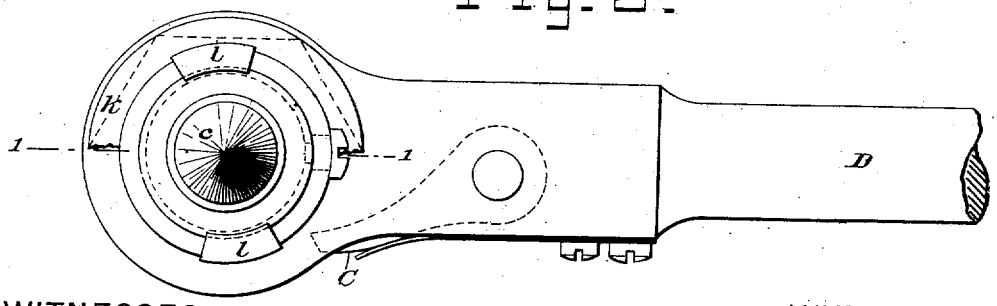
WITNESSES:
E. B. Bolton
Geo. H. Fraser
INVENTOR:
Spencer Gardner,
By his Attorneys,
Burke Fraser Connett
N. PETERS. Photo-Lithographer, Washington, D. C.

2 Sheets—Sheet 2.

S. GARDNER.

RATCHET DRILL.

No. 10,502.

Reissued July 29, 1884.

WITNESSES:

E. B. Bolton

Geo. H. Fraser,

INVENTOR:

Spencer Gardner,

By his Attorneys,

Burke Fraser Hornett

N. PETERS, Photo-Lithographer, Washington, D. C.

UNITED STATES PATENT OFFICE.

SPENCER GARDNER, OF ADDERBURY, ENGLAND.

RATCHET-DRILL.

SPECIFICATION forming part of Reissued Letters Patent No. 10,502, dated July 29, 1884.

Original No. 273,676, dated March 6, 1883. Application for reissue filed April 15, 1884. Patented in England February 21, 1882, No. 739; in Germany May 2, 1882, No. 20,847; in France May 8, 1882, No. 144,832, and in Belgium May 10, 1882, No. 57,874.

*To all whom it may concern:*

Be it known that I, SPENCER GARDNER, a subject of the Queen of Great Britain, and a resident of Adderbury, England, have invented certain Improvements in Drilling-Machines, of which the following is a specification.

My invention relates to an automatic feed-regulator for a hand-drilling-machine, whereby the drill is fed forward as fast as it cuts away the substance being drilled, and no faster. This regulator is capable of being adjusted so that the drill will take a deep or shallow cut—that is, feed faster or slower—as desired. I accomplish the desired regulation of the feed by screw-threading the shank of the stock or holder for the boring-tool, and mounting on it a tubular nut provided with the center-point, which has a bearing on the resisting-bar of the brace. If this nut be prevented from rotating and the drill-stock be turned, it is obvious that the drill will be fed forward at one revolution a distance equal to the pitch of the screw on the shank, and if the nut be allowed to turn with the stock the drill will not be fed forward at all; but if the rotation of the nut with the stock be retarded by a braking-friction with a non-rotating part the drill will be fed forward proportionately to the retardation caused by the friction-brake. Now, if this friction-brake be applied with an elastic pressure and means be provided for increasing and decreasing the elastic tension, it is obvious that the drill may be made to feed faster or take a deeper cut by increasing the elastic tension, and feed slower or take a lighter cut by decreasing said tension. The elastic tension will be adjusted, as occasion requires, to suit the material to be bored and the size and kind of drill employed.

Figure 3:
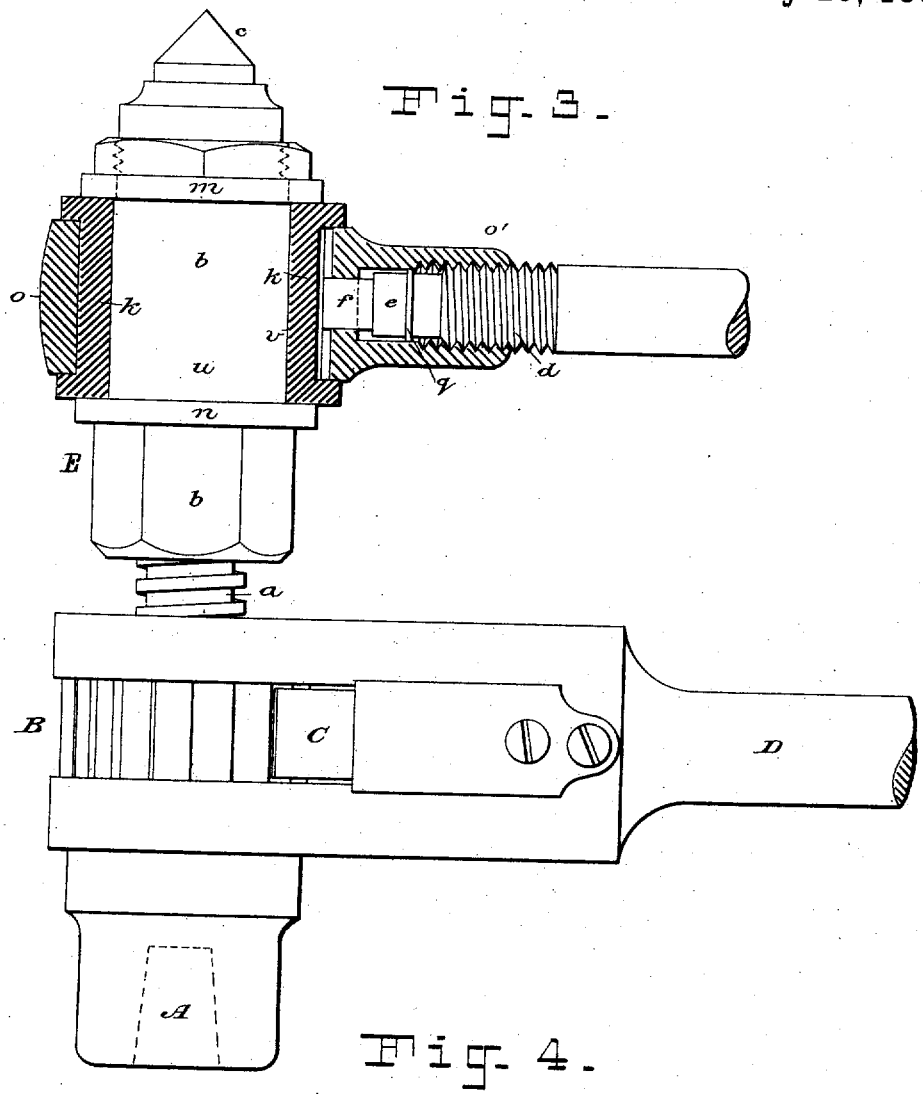
Figure 4:
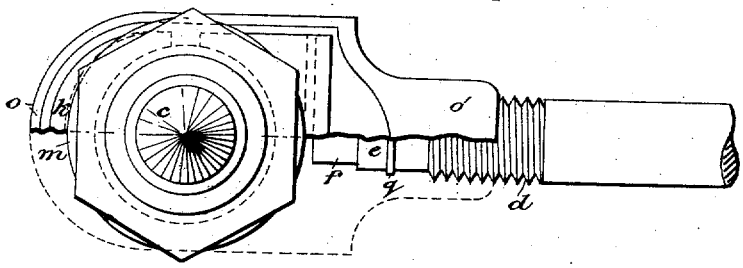

In the drawings which serve to illustrate my invention, I have shown two modes of applying the elastic friction-brake to the feed-nut of a ratchet-brace, one in which the frictional surfaces are arrranged in a plane at right angles to the axis of the drill-stock, as represented in Figures 1 and 2, and one in which the frictional surfaces are arranged parallel with the axis of the stock, being consequently made cylindrical and concentric with the axis, as in Figs. 3 and 4. The position of these surfaces is not very material.

Fig. 1 is a sectional elevation, and Fig. 2 is a plan, of my improved machine in its most approved form. Fig. 3 is a sectional elevation, and Fig. 4 is a mutilated plan, of the modification referred to above.

A is the drill-stock, and *a* is the screw-threaded shank of the same. B is a ratchet-wheel fixed on the stock. C is a pawl which is arranged to engage said ratchet, and which is mounted on the operating-handle D. All of these parts are constructed and arranged as in ordinary ratchet braces or drills.

Referring to Figs. 1 and 2, E is (as a whole) the feeding-nut, which has internal screw-threads that fit and engage the screw-threads on shank *a*. These internal threads are formed on an interior tubular barrel or nut proper, *b*, forming part of the feeding-nut E, and which extends upward and bears the center-point *c*. The feeding-nut E comprises the barrel *b* and a sleeve, *f*, which embraces *b* and may be moved on it longitudinally, but which is compelled to turn with it by reason of a spline, *h*.

Over the upper part of the barrel *b* is slipped a cylindrical non-rotative brake, *k*, its upper end being provided with spurs *l l*, the function of which will be hereinafter described. The lower surface, *v*, of the brake *k* and the upper surface, *u*, of the sleeve *f* (forming part of the feed-nut E) are in frictional connection through the medium of an interposed washer or ring, *i*, of leather or other suitable material. This washer, which is designed to take the wear and increase the friction, is, however, only an adjunct, and it may be considered as forming a part of either the brake *k* or the feed-nut E. It may rotate with the latter or remain stationary with the former. The elastic frictional pressure between this brake *k* and the feed-nut E, which forms the characteristic feature of my invention, is supplied in this construction by a spring, *e*, which is arranged between the sleeve *f* and a nut, *d*, being coiled around the barrel *b*. This nut *d* is screwed upon the exterior of the bottom of the barrel *b*, and affords a means of adjusting the pressure of the spring upon the sleeve *f*, and consequently of regulating the braking-friction applied to the feed-nut E.

In employing my improved drilling-machine it is set in the usual manner, the tip of the drill being seated on the object to be bored, and the center-point *c*, seated firmly against the resisting-bar of the drill. The brake *k* is now moved upward by screwing up the nut *d* (which lifts *e*, *f*, and *k*) until the spurs *l l* are so firmly seated in the resisting-bar that they cannot turn, and will keep the brake *k* stationary during the operation of boring. The tension of the spring *e*, which governs the frictional contact between the rotating feed-nut E and the non-rotating brake *k*, may now be adjusted by the nut *d*, which forms the support and backing for the spring *e* until the required braking-friction on the feed-nut to suit the work in hand is obtained. It will then be found that on rotating the stock in the usual way the friction between the feed-nut and the brake will retard the rotation of the feed-nut to a degree directly proportionate to the difference between the friction of the screw-threads on *a* and *b* and the friction between *f* and *k*. If the friction between *f* and *k* be sufficiently great, then the feed-nut will cease to rotate, and the feed will be equal to the pitch of the screw on *a* for each revolution of the bit. If the nut *d* be run down until the spurs *l l* are out of contact with the resisting-bar, then the brace may be employed in the ordinary way without the automatic feed-regulator—that is to say, the feed-nut may be grasped by the hand and permitted to rotate as rapidly or as slowly as the exigencies may demand.

Figs. 3 and 4 illustrate modifications, wherein the same principles are applied—that is to say, a non-rotative brake is arranged to be applied to the feed-nut by elastic pressure, which pressure may be regulated at will. In the construction illustrated in Figs. 1 and 2 the spring and its adjusting-nut are mounted on the feed-nut, the brake being plain or of one piece. In the modification this arrangement of the parts is reversed, the spring and its backing and adjusting-screw forming a part of the brake and the feed-nut being plain. In the former case the movable part *f* of the feed-nut is interposed between the spring and the brake. In the latter case the brake is in direct contact with the barrel *b*, the brake proper being movable with respect to its holder and other parts.

Referring, now, to Figs. 3 and 4, the feed-nut E comprises only the barrel *b*, which is provided with collars *m* and *n*, and between these the cylindrical body of *b* is embraced by the brake proper, *k*, which in this case is in the form of a journal-box, being in two halves or parts, made of lignum-vitæ or other suitable material. The two sections of the brake proper are embraced by a strap, *o*, which has a socket, *o'*, hollowed to receive the spring *e*, and internally screw-threaded to receive a backing and adjusting-screw *d*. The spring *e* in this case is a block of india-rubber, and between it and *k* is arranged an intermediate part, *f*. The parts *d* and *f* in Figs. 3 and 4 perform substantially the same functions as the parts lettered *d* and *f* in Figs. 1 and 2. The tension of the spring *e* is adjusted by screwing in or out the screw *d*, and between the screw *d* and the spring a washer, *q*, is inserted to take the wear. In using the drill the prolonged extremity of the screw *d* serves as a convenient means for rendering the brake non-rotative. It may be held by the hand, or be prevented from rotating in any way most convenient. The collar *m* is made removable. However the spring be applied to press the non-rotative brake against some portion of the feed-nut, its effect is to impart to the frictional surfaces a yielding contact, which insures a uniform degree of frictional retardation after the desired adjustment is attained, and admits of a nicety of adjustment which would be otherwise impossible. It is to this feature that the practical value of my improved feed is due.

Having thus described my invention, I claim—

1. In a drilling-machine, the combination, with the drill-holder or stock thereof, having a screw-threaded shank, of a feed-nut mounted on and engaging said shank, a non-rotative brake arranged in frictional contact with some part of said feed-nut, and a spring arranged to press together said brake and feed-nut, substantially as set forth, whereby the rotation of the feed-nut will be retarded by a yielding friction and the drill be fed to its work uniformly and automatically.

2. In a drilling-machine, the combination, with the drill-holder or stock thereof, having a screw-threaded shank, of a feed-nut mounted on and engaging said shank, a non-rotative brake arranged in frictional contact with some part of said feed-nut, a spring arranged to press together said brake and feed-nut, and an adjusting screw or nut adapted to compress said spring more or less, substantially as set forth, whereby the rotation of the feed-nut will be retarded by a yielding friction, which can be accurately adjusted to regulate the rate of feed of the drill.

3. The combination, in a drilling-machine, with the drill-holder or stock thereof, having a screw-threaded shank, *a*, of the feed-nut E, consisting of threaded barrel *b* and splined sleeve *f*, and provided with center-point *c*, the spring *e*, a support upon the barrel *b*, for said spring, and the non-rotative brake *k*, all arranged to operate, substantially as set forth.

4. The combination, in a drilling-machine, with the drill-stock thereof, having a screw-threaded shank, *a*, of the feed-nut E, consisting of threaded barrel *b* and splined sleeve *f*, the center-point *c*, adjusting-nut *d*, and spring *e*, and the non-rotative brake *k*, provided with spurs *l l*, substantially as and for the purposes set forth.

In witness whereof I have hereunto signed my name in the presence of two subscribing witnesses.

SPENCER GARDNER.

Witnesses:

ARTHUR C. FRASER,
GEO. H. FRASER.